United States Patent [19]

Basic et al.

[11] Patent Number: 4,793,263

[45] Date of Patent: Dec. 27, 1988

[54] INTEGRATED LINEAR SYNCHRONOUS UNIPOLAR MOTOR WITH CONTROLLED PERMANENT MAGNET BIAS

[75] Inventors: John J. Basic, Renton; Richard G. Gilliland, Redmond, both of Wash.

[73] Assignee: The Boeing Company, Seattle, Wash.

[21] Appl. No.: 891,607

[22] Filed: Aug. 1, 1986

[51] Int. Cl.$^4$ ............................................. B61B 13/08
[52] U.S. Cl. ................................... 104/282; 104/286; 104/293; 104/294; 310/12; 310/13
[58] Field of Search ............................... 104/281-284, 104/290, 292, 293, 294, 89; 310/12, 13

[56] References Cited

U.S. PATENT DOCUMENTS

| | | | |
|---|---|---|---|
| 2,876,404 | 3/1959 | Hannula | 318/22 |
| 3,158,765 | 11/1964 | Polgreen | 310/12 |
| 3,385,228 | 5/1968 | Chung | 104/134 |
| 3,585,423 | 6/1971 | Bolton et al. | 310/13 |
| 3,741,613 | 6/1973 | Pfaler | 104/281 |
| 3,746,899 | 7/1973 | Eastham | 104/294 |
| 3,783,794 | 1/1974 | Gopfert et al. | 104/148 |
| 3,820,470 | 6/1974 | Karch et al. | 104/148 |
| 3,828,686 | 8/1974 | Steenbeck et al. | 104/148 |
| 3,884,154 | 5/1975 | Marten | 104/282 |
| 3,886,871 | 6/1975 | Ross et al. | 105/157 |
| 3,899,979 | 8/1975 | Godsey, Jr. | 104/148 |
| 4,037,122 | 7/1977 | Bonner et al. | 310/12 |
| 4,055,123 | 10/1977 | Heidelberg | 104/148 |
| 4,123,976 | 11/1978 | Nakamura et al. | 104/281 |
| 4,689,529 | 8/1987 | Higuichi | 104/281 |
| 4,690,066 | 9/1987 | Morishita | 104/282 |

FOREIGN PATENT DOCUMENTS 0132005  6/1986  Japan .................................. 104/284

OTHER PUBLICATIONS

A. Eastham, G. Dawson, D. Atherton, S. Dewan, G. Slemon, R. Ong, W. Ballantyne, L. Coathup, *Analysis and Assessment of the Homopolar Linear Synchronous Motor for Urban Transit Applications*, app. E (1984), available as CIGGT Report No. 84-2.

E. Levi, *Design Studies on Iron-Core Synchronously Operating Linear Motors*, 13–17 (1981), available as U S DOT Report No. FRA/ORD 81/74.

E. Levi, *High-Speed, Iron-Cored, Synchronously Operating Linear Motors* (1974), presented at IEE Conference on Linear Electric Machines, London.

G. Slemon, R. Bhatia, *Linear Homopolar Synchronous Motor for Urban Transit Application* (1982), available in Can. Elec. Eng. J., vol. 7, No. 2.

G. Dawson, E. Unteregelsbacher, *A Transverse Laminated Linear Synchronous Homopolar Machine* (1980), presented at IEEE IAS Annual Meeting, Cincinnati.

*Primary Examiner*—Robert B. Reeves
*Assistant Examiner*—Donald T. Hajec
*Attorney, Agent, or Firm*—Christensen, O'Connor, Johnson & Kindness

[57] ABSTRACT

Disclosed is a single, integrated linear synchronous unipolar motor having high-energy permanent magnets operable along a substantially linear demagnetization curve and a polyphase coil. Collectively, the permanent magnets and polyphase coil provide for propulsion, suspension, braking and lateral control of a vehicle along a passive reaction rail. The permanent magnets provide the primary force for suspending the vehicle from the guideway, with a DC field control coil controlling the suspension gap between the vehicle and the reaction rail. The polyphase coil propels the vehicle along the track at a speed dependent upon the voltage and frequency of the supplied signal. The motor exhibits a high power factor and efficiency factor, resulting in a motor that can be operated from a power source having a lower KVA rating than that required for previous linear motor arrangements and that can be used in concert with a low-cost, passive guideway.

20 Claims, 5 Drawing Sheets

INTEGRATED LINEAR SYNCHRONOUS UNIPOLAR MOTOR WITH CONTROLLED PERMANENT MAGNET BIAS

The United States government has rights in this invention, pursuant to Contract No. DTUM60-80-C-71009, awarded by the Department of Transportation.

BACKGROUND OF THE INVENTION

This invention relates to suspension and propulsion systems for use in transportation and, more specifically, to a single integrated device including means for suspending a vehicle from a passive roadway and an electric motor for propelling the vehicle along the passive roadway.

Efforts have long been made to develop faster, safer, and more efficient forms of transportation. The problems encountered have been numerous. This is particularly true in large cities, where traffic congestion, system costs, and pollution have become acute. The present invention addresses these problems, providing a solution to a number of them.

Two elements common to surface transportation systems are a means of suspending a vehicle with respect to a roadway and a means of propelling the vehicle along that roadway. The earliest and most common suspension systems are primarily mechanical, including wheels affixed to axles. Such systems, however, are subject to a number of shortcomings. For example, contact between the wheels and the roadway introduces significant frictional forces, which produce drag on the vehicle and reduce system efficiency. Similarly, the wear introduced by moving parts typically requires additional maintenance of the system, thereby increasing the system's cost of operation. The ride comfort and noise of the system are also deleteriously affected by the moving wheels in contact with the roadway.

One proposal for overcoming these drawbacks is the use of magnetic forces to suspend the vehicle in a non-contacting, controlled relationship to the roadway. For example, magnetic repulsion between magnet members located on both the roadway and the vehicle can be used for supsension. Similarly, the attractive force between magnets of opposite polarity, or magnets and a magnetically permeable material, such as iron, can be used to eliminate contact between the vehicle and the roadway.

Because magnetic attraction systems are inherently unstable and require closed-loop control for proper operation, electromagnets are frequently employed. The electromagnets perform vehicle suspension by adjusting the magnetic field needed to produce the desired spacing between the vehicle and roadway. Electromagnets used in suspension systems, however, are subject to a number of shortcomings. For example, electromagnets used as the primary source of suspension consume a substantial amount of energy. With electromagnets employed onboard the vehicle for this purpose, large power supplies must also be included, increasing vehicle weight and impairing system efficiency. While offboard power supplies would decrease vehicle weight, realtime control of the suspension gap between the vehicle and roadway becomes impractical. The use of offboard electromagnets for suspension would also make real-time control impractical, as well as involve large expenditures of initial captial to provide the requisite number of electromagnets.

Because of the weight, size, and power requirements of suitable electromagnets, some efforts have been made to utilize permanent magnets that contain rare-earth elements and exhibit both high magnet flux density and a relative permeability that is near unit. For example, U.S. Pat. No. 3,783,794 discloses a suspension system employing separate electromagnet and rare-earth permanent magnet elements, with the rare-earth permanent magnet element providing most of the suspending force and the electromagnet element controlling the gap between the vehicle and the roadway.

Electromagnetic propulsion systems have also been developed. For example, linear electric motors have been designed for vehicles equipped with an electromagnetic suspension system, the suspension system being either incorporated in the motor or separate. Most of the prior art effort has been directed to linear induction motors, because induction motors of a given power rating are generally lighter than synchronous motors of equal power rating. The power factor of a linear induction motor, however, is relatively low, requiring a large and heavy variable-voltage, variable-frequency power supply. In addition, linear induction motors consume a relatively large amount of energy.

While linear synchronous motors offer certain advantages over linear induction motors, prior art linear synchronous motors are also unsatisfactory in many respects. For example, while long-stator linear synchronous motors, having coil windings distributed the length of the roadway, provide a high power factor, they still consume a relatively large amount of energy and require substantial electrical conditioning for proper operation. In addition, the polyphase coil windings required for the roadway involve enormous expenditures of initial captial. Short-stator linear synchronous motors, having their propulsion coil windings located onboard the vehicle, experience the problems of real-time control and expense previously described in connection with suspension systems when offboard suspension is employed, Short-stator linear synchronous motors employing onboard electromagnetic suspension in conjunction with the onboard synchronous motor (often referred to as linear synchronous homopolar, or unipolar, motors) experience problems of substantial energy consumption and electrical conditioning requirements. In addition, prior to this invention, researchers had not been successful in constructing a uinpolar motor that incorporates permanent magnets for providing a majority of the vehicle suspension force.

SUMMARY OF THE INVENTION

This invention provides, in a single integrated device, propulsion, suspension, braking, and lateral control systems for operation of a vehicle along a passive roadway. The device disclosed is a short-stator linear synchronous unipolar motor that includes a stator assembly extending longitudinally along the vehicle and a magnetically permeable reaction rail that confronts the stator assembly and extends along the passive, vehicle guideway or track. Integrated in the stator assembly are: (a) a stator body, constructed of magnetically permeable material (e.g., laminated or solid iron), including the stator teeth, and to which the components that provide the necessary magnetic fields are mounted; (b) a polyphase AC coil, which supplies the propulsion force and is wound in a prescribed manner about the teeth of the stator body; (c) a plurality of "select" permanent magnets exhibiting high energy and linear B/H curves and providing the primary vehicle-lifting force (for example, certain rare-earth magnets); and, (d) a device for establishing and maintaining (i.e., controlling) the desired gap between the suspended vehicle and the passive guideway, such as a direct current field control coil energized to selectively increase and decrease the magnetic field established by the rare-earth permanent magnets.

The stator body acts primarily as a flux path for the magnetic field supplied by the select permanent magnets and the DC field control coil to establish controlled vehicle lift. Similarly, the stator body provides a flux path for the magnetic field supplied by the polyphase propulsion coil in establishing thrust. In the preferred embodiment of the invention, the stator body has a U-shaped cross section and extends longitudinally above or below the vehicle. slots, of uniform configuration and spacing, extend through the two sidewalls of the stator body to form the stator teeth.

The polyphase AC propulsion coil is arranged in the slots of the stator body so that a polyphase AC voltage impressed across the propulsion coil leads establishes a moving wave of magnetic flux that continuously travels longitudinally along the stator body. The thrust developed between the stator assembly and the reaction rail by the moving wave of magnetic flux propels the stator assembly, and the vehicle to which it is affixed, along the passive reaction rail and guideway.

In one embodiment of the invention, the select permanent magnets are located along and within both sidewalls of the stator body. In a second embodiment, the magnets are located within the crossmember of the U-shaped stator body. In either case, the poles of the permanent magnets are positioned to cause the outer ends of the two stator body sidewalls to exhibit opposite magnetic polarity. The resultant attractive force, which occurs in the air gap between the stator and the reaction rail, attracts the vehicle to the passive guideway.

One disclosed means for establishing and maintaining the desired air gap between the stator body (i.e., the vehicle) and the passive reaction rail utilizes a DC field control coil that is wound around a portion of the stator body. An air gap detection device senses the length of the air gap and controls the amount of current flowing in the DC field control coil to establish the gap at a desired value and/or maintain a particular gap independent of the weight carried by the vehicle. For example, if more weight is carried, current is supplied to the DC field control coil to establish a magnetic field that aids the permanent magnet field. When weight is removed from the vehicle, the level of DC current flowing in the DC coil is decreased or its direction reversed to reduce the overall magnetic force between the stator assembly and reaction rail, thereby controlling the air gap.

An alternative means for establishing and maintaining the desired air gap between the vehicle and passive roadway employs a plurality of wheels linked to the vehicle. In this arrangement, the permanent magnets develop an attractive force between the vehicle and roadway that is of sufficient strength to maintain the wheels of the vehicle in contact with the guideway under all vehicle loads. The action of the wheels against the guideway establishes a working air gap between the stator body and reaction rail when vehicle loading is at a minimum. As vehicle loading is increased to a maximum, this air gap decreases to a minimum.

Because the speed of the linear synchronous unipolar motor is a function of the frequency of the polyphase voltage impressed across the propulsion coil, the vehicle also contains a variable-voltage, variable-frequency, polyphase AC voltage source. The speed of the vehicle can thus be controlled by varying the voltage and frequency of the AC voltage supply.

The integrated linear suynchronous unipolar motor of this invention constitutes a single source of suspension and propulsion that exhibits both high efficiency (typically on the order of 0.9) and a high power factor (typically approaching unity). Because the permanent magnets and DC field control coil provide suspension with minimal power input, and because of the motor's high efficiency and power factor, motor voltage and current power-conditioning requirements are substantially reduced relative to linear induction motors. Thus, the power supply equipment carried by the vehicle is substantially smaller and lighter than the equipment required in prior art systems.

BRIEF DESCRIPTION OF THE DRAWINGS

The present invention will now be described in greater detail, by way of example, with reference to the accompanying drawings, wherein.

DETAILED DESCRIPTION OF THE INVENTION

Figure 1:
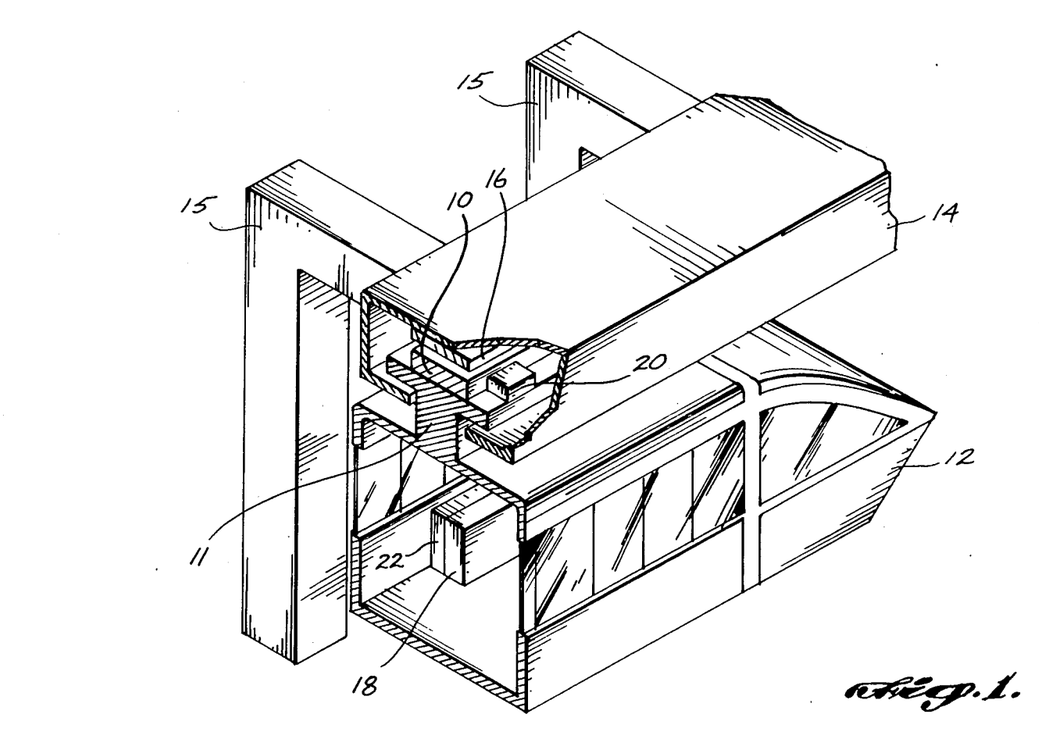
FIG. 1 is an isometric view of one arrangement in which a vehicle is suspended below a guideway and propelled therealong by a linear synchronous unipolar motor that is configured in accordance with the invention.
Figure 2:
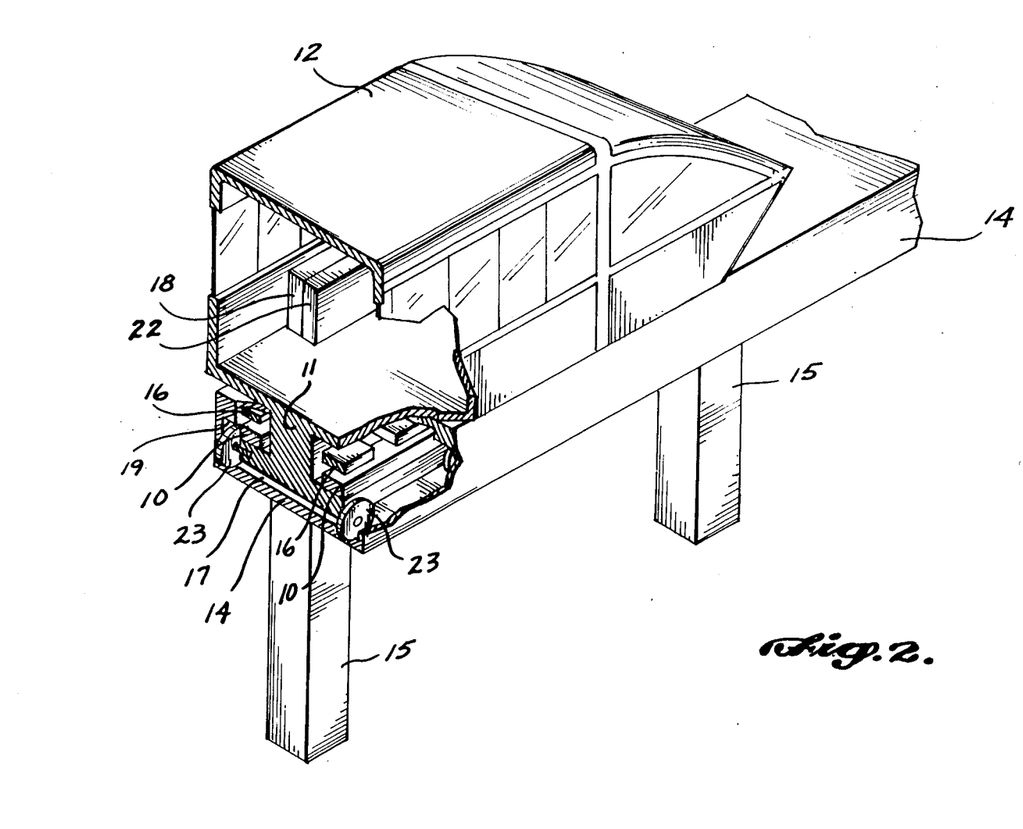
FIG. 2 is an isometric view of another arrangement in which a vehicle is suspended above a guideway and propelled therealong by a linear synchronous unipolar motor that is configured in accordance with this invention.

FIGS. 1 and 2 illustrate two arrangements of a transportation system advantageously employing the present invention. In FIG. 1, the stator assembly 10 of a linear synchronous unipolar motor extends longitudinally along a carrier 11 located on top of vehicle 12. Carrier 11 extends into a guideway 14, which controls the path of vehicle 12 travel and is supported by columns 15. In this manner, stator assembly 10 confronts (e.g., is juxtaposed with) a magnetically permeable reaction rail 16 attached to guideway 14. A polyphase AC voltage source 18 of variable voltage and frequency is contained on the vehicle 12 and supplies stator assembly 10 with the energy needed to propel vehicle 12 along the guideway 14. An air gap detection device 20 and DC power supply 22 are included to control the air gap between the vehicle 12 and the guideway 14. The attractive force between the unipolar motor and reaction rail 16 lifts vehicle 12 toward the guideway 14, suspending it from the guideway 14, while the unipolar motor additionally provides the thrust needed to propel vehicle 12.

In FIG. 2, two stator assemblies 10 extend longitudinally along a carrier 11 located beneath vehicle 12. As in FIG. 1, carrier 11 extends into a guideway 14, supported by columns 15 and determining the path of vehicle 12 travel. The stator assemblies 10 thus confront magnetically permeable reaction rails 16 attached to guideway 14. A variable-voltage, variable-frequency, AC voltage source 18 is employed to supply the stator assemblies 10 with the energy needed to propel vehicle 12 along guideway 14. In this arrangement, wheels 23 are shown as an alternative means of controlling the air gap between vehicle 12 and the guideway 14.

Figure 3:
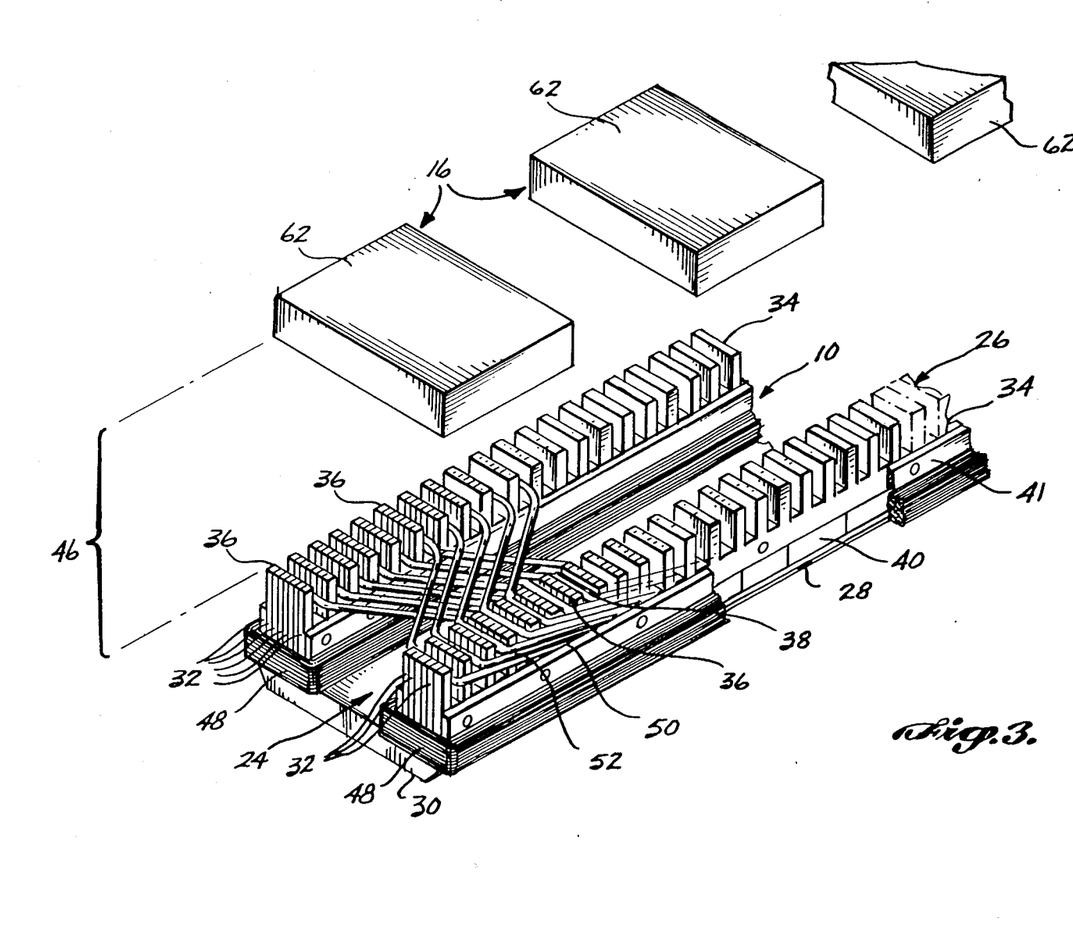
FIG. 3 is an isometric view of an embodiment of the invention in which a propulsion coil is wound in the slots of a U-shaped stator body in a figure-eight arrangement, select permanent magnets are located along sidewalls of the stator body, and field control coils are wound around the stator body.

As is illustrated by FIG. 3, stator assembly 10 includes a stator body 26 formed from a material having a high magnetic permeability and having a U-shaped cross section. In the depicted arrangement, U-shaped stator body 26 includes a rectangular crossmember 30 such as a plate of iron or other magnetically permeable material. Extending orthogonally upward from each longitudinal edge of crossmember 30 is a sidewall 34 that includes a plurality of relatively thin sheets 32 of iron or other material of relatively high permeability and one or more "select" permanent magnets 40 interposed between sheets 32 and crossmember 30. Sheets 32 and permanent magnets 40 are secured between sideplates 41 by spaced-apart bolts 28 (or other conventional fasteners). The sideplates 41 and additional bolts 28 are used to secure the lower portion of each sidewall 34 to crossmember 30. Equally spaced-apart rectangular slots 38 extend orthogonally through the upper, laminated portion of each sidewall 34. In the currently preferred embodiments, stator body 26 includes two slots 38 per phase per pole, with the teeth 36 that are formed between slots 38 being dimensioned to achieve the desired magnetic saturation. As is shown in FIG. 3, slots 38 of sidewalls 34 are arranged in oppositely disposed pairs in that the slots 38 in the right-hand sidewall 34 of FIG. 3 are aligned with the slots 38 in the left-hand sidewall 34.

As noted above, stator assembly 10 includes one or more "select" permanent magnets 40 mounted in stator body 26. The select magnets 40 used in this invention are characterized by their relatively high energy per unit volume (for example, greater than 20 megagauss-oersted) and operate along a demagnetization curve that is substantially linear (straight line) throughout the second quadrant. The linear nature of the demagnetization curve allows magnets 40 to be exposed to AC or DC magnetic fields without adversely affecting the flux output of the magnets 40 during repeated demagnetizing influences. At present, it appears that ony certain rare-earth permanent magnets, for example, $RE_2TM_{17}$ or NdBFe, exhibit the desired characteristics.

As shown in FIG. 3, permanent magnets 40 are of rectangular geometry and are mounted between sheets 32 of sidewall 34 and cross-member 30. Each magnet 40 contacts or closely abuts the adjacent portion of crossmember 30 and the adjacent portions of sidewall 34 to eliminate or minmize formation of air gaps. For convenience in assembly and handling, a number of smaller permanent magnets are employed.

In the arrangement of FIG. 3, magnets 40 mounted in one sidewall 34 are positioned with like magnetic poles directed toward slots 38 of that sidewall 34, while in the other sidewall 34 all permanent magnetic poles of opposite polarity are directed toward slots 38. Thus, those magnets 40 located in one sidewall 34 will have their north poles oriented toward the slots 38 of that sidewall 34, while those magnets 40 located in the other sidewall 34 will have their south poles positioned toward slots 38 of that sidewall 34. This produces a magnetic field in which magnetic lines of flux extend through the U-shaped stator body 26 and across an air gap 46 formed between the upper face of sidewalls 34 and reaction rail 16. This magnetic field establishes an attractive force between the reaction rail 16 and the stator body 26, which lifts and suspends the vehicle 12.

In the arrangement shown in FIG. 3, a DC field control coil 48 is wound longitudinally around each sidewall 34 of stator body 26 such that each coil 48 encircles the portion of sidewall 34 that includes permanent magnets 40. When energized by the DC power supply 22 onboard vehicle 12 (FIG. 1), field control coils 48 establish an electromagnetic field that follows the same flux path as the field established by the magnets 40. By varying the direction and magnitude of the DC current supplied to the field control coils 48 by supply 22, the magnetic field of the DC coils 48 either increases ("boosts") the magnetic field established by magnets 40, or decreases ("bucks") the magnetic field of the magnets 40. As the magnetic field is altered, the suspension gap 46 between the vehicle 12 and guideway 14 will vary in inverse proportion to the strength of the magnetic field established by permanent magnets 40 and DC coils 48.

The currently preferred embodiments of the invention include a gap detection device 20 that employs conventional noncontacting transducers to produce a gap reference signal representative of the suspension gap 46. The reference signal is, in turn, used to control the magnitude and direction of the current supplied to the field control coils 48 by power supply 22. Thus, the suspension gap detection device 20 can be used to maintain a uniform suspension gap 46 under various loadings of the vehicle 12 by causing power supply 22 to supply more current to the field control coils 48 when heavier vehicle loading occurs and less current when loading decreases. In a preferred embodiment of the invention, the air gap 46 is maintained at approximately one-half inch (11 millimeters).

Figure 4:
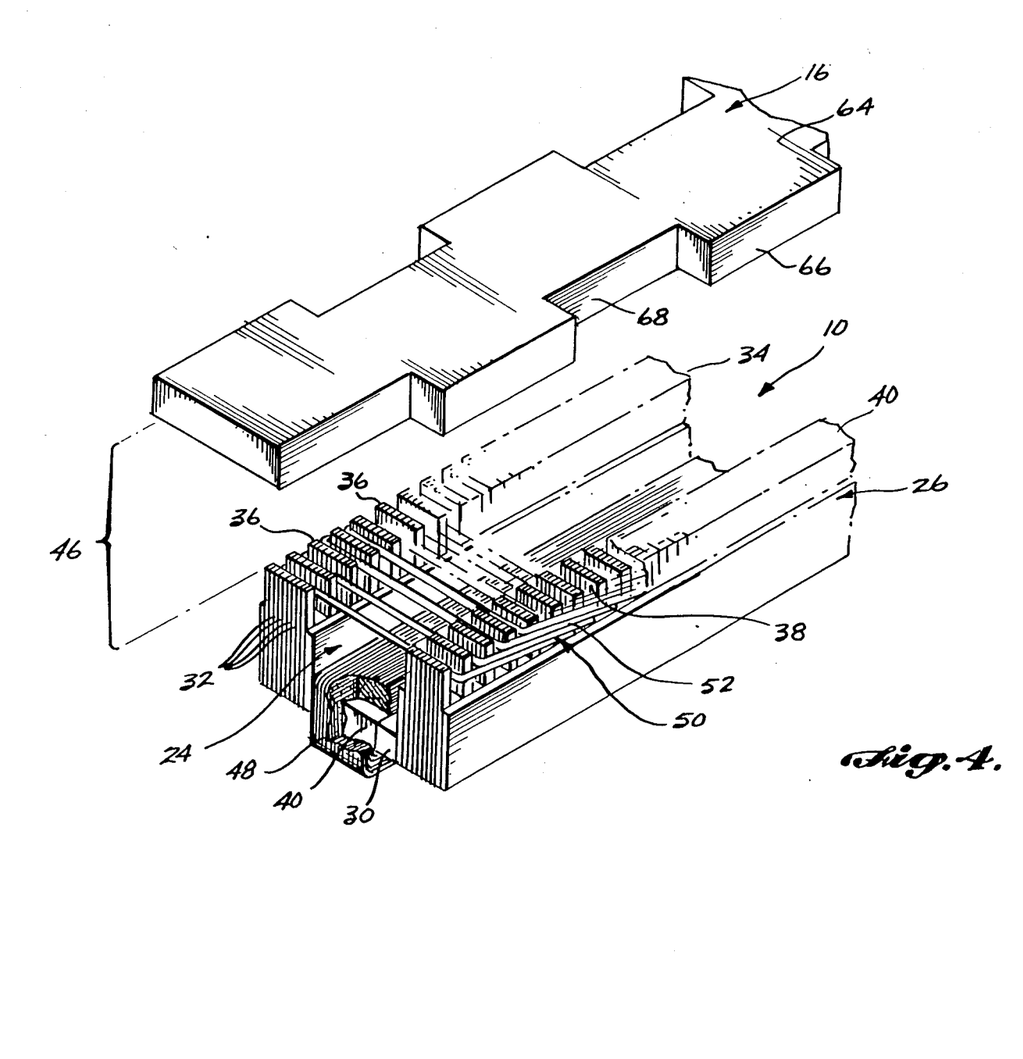
FIG. 4 is an isometric view of a second embodiment of the invention in which the permanent magnets are located along a crossmember of the U-shaped stator body, a field control coil is wound about the crossmember, and an alternative propulsion winding pattern is employed.

FIG. 4 depicts an embodiment in which a permanent magnet 40 is mounted within stator body crossmember 30 and a single field control coil 48 is employed. The permanent magnet 40 is mounted along the axial centerline of crossmember 30 with the poles pointing toward the sidewalsl 34. Thus, the upper faces of sidewalls 34 of stator body 26 exhibit opposite magnetic polarity and the magnetic field produced is substantially identical to that produced by the arrangement of FIG. 3.

A single DC field control coil 48 is wound longitudinally around the crossmember 30 of FIG. 4 to encircle magnet 40. When a DC current of variable magnitude and direction is supplied to coil 48, the coil produces a magnetic field that selectively increases or decreases the magnetic field established by the permanent magnet 40. Thus, the gap 46 between the stator assembly 26 and the reaction rail 16 can be controlled in the previously described manner.

An alternative means of maintaining the air gap under various vehicle loads can be employed in place of the gap detection device 20, DC power supply 22, and field control coils 48. In this arrangement, a plurality of wheels 15 extend from each side of the carrier 11 and are connected to carrier 11 by suspension linkage. Wheels 15 operate substantially vertically between opposing horizontal surfaces 17 and 19 provided longitudinally on both sides of the guideway 14. The spacing between lower and upper surfaces 17 and 19 is greater than the diameter of wheels 15. The wheels 15 on each side of carrier 11 are maintained in contact with the corresponding upper surfaces 19 of guideway 14 by the magnetic field developed by permanent magnets 40. Thus, a working air gap is produced between stator body 26 and reaction rail 16. When vehicle 12 is fully loaded, the suspension linkage allows the air gap to decrease. The magnets are then able to support the additional vehicle weight. Regardless of vehicle 12 loading, the selection and arrangement of the permanent magnets 40 is such that a low force (approximately 10% of vehicle weight) develops between the wheels 15 and guideway surface 19 during motion of vehicle 12. In this manner, maximum and minimum air gaps between stator body 26 and reaction rail 16 are established without excessive energy losses in the form of friction.

The arrangements of both FIG. 3 and FIG. 4 employ polyphase AC propulsion coils 50 uniformly arranged in the slots 38 of stator bodies 26. As will be readily apparent to one of ordinary skill in the art, the AC propulsion coils 50 can be wound in a number of patterns capable of producing a moving wave of magnetic flux that continuously travels longitudinally along the stator body 26. In the currently preferred embodiment of FIG. 3, the individual windings 52 of propulsion coil 50 form a three-phase, Y-connected winding that is arranged in a distributed, figure-eight configuration.

When the distributed figure-eight, winding pattern of FIG. 3 is employed, the reaction rail 16 can be magnetically permeable, elongate members that extend along the guideway 14 of FIG. 1. For example, in FIG. 3, the reaction rail 176 is formed by a series of rectangular plates that are spaced apart from one another along the guideway and are made of a material having a high magnetic permeability (e.g., iron).

In the embodiment of FIG. 4, the propulsion coil 50 is wound in a conventional, ladder-like pattern.

With propulsion coil 50 wound in this manner, distinct pole pieces must be formed on reaction rail 16. For example, FIG. 4 illustrates a relatively flat reaction rail 16 having integrally formed rectangular poles 66 that extend outwardly from each sidewall 68. The poles 66 are spaced apart from one another and the poles 66 that extend from one sidewall 68 are staggered in relation to the poles 66 of the other sidewall 68. Thus, a vehicle 12 traveling along guideway 14 (FIG. 1) would traverse a first pole 66 formed in a first sidewall 68 of reaction rail 16 before traversing the next pole 66, which is formed in the second sidewall 68.

Figure 5:
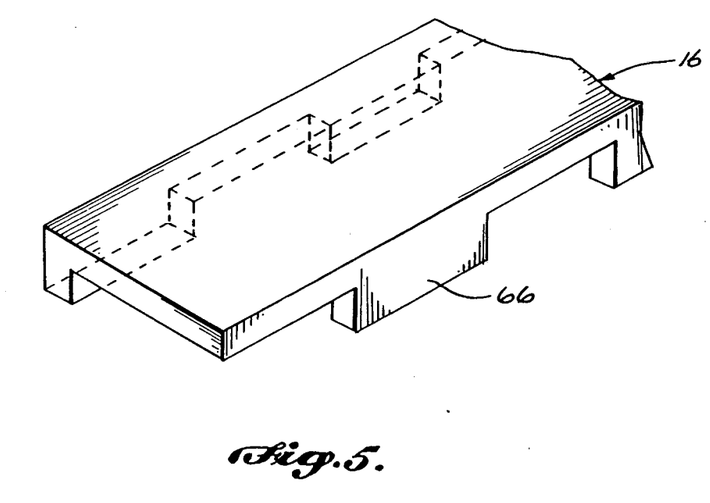
FIG. 5 is an isometric view of an alternative reaction rail for use in the linear synchronous unipolar motor of FIG. 4.

FIG. 5 illustrates a second type of reaction rail 16 that can be used with a propulsion coil 50 of the type shown in FIG. 4. The reaction rail 16 of FIG. 5 is similar to reaction rail 16 of FIG. 4, except that the poles 66 extend orthogonally outward from the reaction rail, being directed toward the stator body 26 (i.e., toward vehicle 12 in FIG. 1). Although poles 66 of rectangular vertical cross section are shown in FIG. 5, various trapezoidal cross sections can be employed to provide reduced flux leakage.

The polyphase AC propulsion coils 50 and reaction rails 16 operate in the following manner. When a polyphase AC voltage is supplied to the propulsion coil from the polyphase AC voltage source 18 of FIG. 1, a moving wave of magnetic flux is established by the propulsion coil 50 in a manner known in the prior art. The moving wave of magnetic flux travels at a speed that is directly proportional to the frequency of the voltage supplied by polyphase AC voltage source 18 and the pole pitch of the motor. The thrust exerted by the moving wave of magnetic flux between the reaction rail 16 and the stator 26 propels the stator assembly 26 (and hence vehicle 12) along the reaction rail 16 at a speed proportional to the frequency of the polyphase AC voltage source 18. Shifting the phase of the signals supplied to each winding allows the motor to act as a generator, creating electrical energy during deceleration, and performing the braking and stopping functions of the system. The electrical energy generated may be dissipated through a resistor bank or conserved by a regenerative electrical arrangement for use in the system at another location and time. In light of the foregoing, it is seen that the speed of the vehicle 12 can be controlled by varying the voltage and frequency of the polyphase AC voltage source 18, allowing both braking and acceleration to be achieved.

As noted previously, a number of arrangements of windings 52 can be employed to produce the desired pattern of magnetic flux. For example, although not illustrated, each sidewall 34 may be provided with its own independent winding. Similarly, a single, offset winding having dogleg-shaped turns of appropriate orientation and spacing may be employed. The particular winding configuration selected is, in part, a function of the cost of the wire required and the energy loss associated with the passage of current from the polyphase AC voltage source through the coil or coils. Lateral control of the disclosed motor, and hence the vehicle 12, is inherent in the magnetic fields developed by the select permanent magnets 40 since the magnetic fields tend to align the stator body 26 longitudinally with the axis of reaction rail 16.

Although the alternate configurations of FIGS. 3, 4, and 5 each provide the desired results, the embodiment of FIG. 3 requires less material for constructing reaction rail 16 and results in a reaction rail 16 that easily can be laminated (if desired). The stator body 26 of this embodiment requires the somewhat more complex figure-eight propulsion coil 50 winding. The embodiments of FIGS. 4 and 5, on the other hand, require reaction rails 16 having a more complex geometry and requiring more material for construction, but allow the use of less complicated square-wound AC propulsion coil 50 windings. Since the figure-eight propulsion coil simplifies the geometry and minimizes the weight of the reaction rails, and since the permanent magnet/field control coil arrangement shown in FIG. 3 exhibits lower flux leakage than the magnet/coil arrangement of FIG. 4, the arrangement of FIG. 3 is the currently preferred embodiment.

The invention, as described above, has a number of advantages over prior transportation systems. By employing select permanent magnets as a means of suspension, onboard power consumption for vehicle suspension is minimized. Similarly, the use of a short-stator linear synchronous unipolar motor having a high power factor and high efficiency substantially reduces power supply requirements relative to earlier linear induction motor designs. Further, the initial cost of a system employing the invention is substantially lower than a system that employs a long-stator linear synchronous unipolar motor.

It is to be understood that the invention may be embodied in various forms without departing from the spirit or basic characteristics of the invention. For example, the permanent magnet/field control coil arrangement of FIG. 3 can be utilized with the propulsion coil winding pattern of FIG. 4 (and vice versa). The number of permanent magnets, as well as their exact location on the stator, is subject to variation. Similarly, the number of DC control coils and their location on the stator, with respect to the magnets, may be altered. In addition, while the invention was particularly designed for use in transportation systems, it is readily applicable to any situation in which a relatively large body is propelled over a surface. Thus, the illustrated and above-described embodiments are to be considered in all respects as illustrative and not restrictive and the scope of the invention is to be determined by the appended claims, rather than by the drawings and foregoing description.

The embodiments of the invention in which an exclusive property or privilege is claimed are defined as follows:

1. A single, integrated device for the magnetic suspension, propulsion, braking, and lateral control of at least one vehicle in cooperation with a passive guideway, said guideway having a passive reaction rail formed of a magnetic material and extending the length of said guideway, said device comprising:
   a stator body affixed to said vehicle in confronting relationship with said reaction rail, said stator body being formed of magnetic material and including a plurality of teeth that are spaced apart from one another;
   at least one high-energy permanent magnet operable along a substantially linear demagnetization curve and mounted to said stator body with the poles of each said permanent magnet arranged to produce a first magnetic field having lines of magnetic flux completing a path through each said permanent magnet, an adjoining portion of said stator body and said reaction rail, said first magnetic field producing an attractive force between said stator body and said reaction rail that tends to suspend said vehicle from said guideway;
   means for maintaining a desired air gap between said guideway and said vehicle suspended from said guideway by said first magnetic field; and,
   a polyphase propulsion coil wound through the spaces between said teeth of said stator body, said polyphase propulsion coil for producing a wave of magnetic flux that continuously travels the length of said stator body when a polyphase, AC voltage is supplied to said propulsion coil, said wave of magnetic flux traveling at a speed directly proportional to the pole pitch and the frequency of said AC voltage and applying a force between said stator body and said reaction rail tending to cause said vehicle to be propelled along said guideway at said speed of said wave of magnetic flux.

2. The device of claim 1, wherein said high-energy permanent magnet operable along a substantially linear demagnetization curve comprises a rare-earth permanent magnet.

3. The device of claim 1, wherein said means for maintaining said desired air gap comprises a plurality of wheels affixed to said vehicle in confronting relationship with said guideway, said wheels maintaining said desired air gap by contacting said guideway and limiting the proximity between said stator body and said reaction rail.

4. The device of claim 1, wherein said means for maintaining said desired air gap comprises:
   at least one field control coil wound about said stator body;
   an air-gap detection device for producing an indication of the length of said air gap between said guideway and said vehicle; and
   a DC power supply for supplying energy to said field control coil in response to said indication of said length of said air gap produced by said gap detection device, said energy supplied to said field control coil producing a second magnetic field that selectively increases and decreases said first magnetic field and suspends said vehicle from said guideway by said desired air gap.

5. The device of claim 4, wherein said stator body has a substantially U-shaped cross-sectional geometry defined by spaced-apart first and second sidewalls, having first and second ends, and a crossmember that extends between said first end of each of said first and second sidewalls, said spaced-apart teeth being formed in portions of each of said first and second sidewalls that are adjacent said second ends of said first and second sidewalls.

6. The device of claim 5, wherein each said high-energy permanent magnet is mounted in said crossmember of said stator body, each said permanent magnet having the magnetic poles directed toward said first sidewall of said stator body.

7. The device of claim 6, wherein said field control coil is wound longitudinally around said longitudinal crossmember of said stator body to encompass each said permanent magnet.

8. The device of claim 7, wherein each of said first and second sidewalls includes a plurality of sheets of magnetically permeable material, said sheets being laminated to one another and extending from said first ends of said first and second sidewalls to said second ends thereof.

9. The system of claim 5, including at least one pair of said high-energy permanent magnets wherein one permanent magnet of each said pair of high-energy permanent magnets is mounted in a portion of said first sidewall and the second permanent magnet is mounted in said second sidewall with each said permanent magnet being proximate said first end of said first and second sidewalls, each said permanent magnet mounted in said first sidewall having like magnetic poles directed toward said second end of said first sidewall and each said permanent magnet mounted in said second sidewall having like magnetic poles directed toward said second end of said second sidewall, said like magnetic poles directed toward said second end of said first sidewall being of opposite polarity to said like magnetic poles directed toward said second end of said second sidewall.

10. The device of claim 9, wherein said field control coil includes a first coil wound about the portion of said first sidewall of said stator body containing each said permanent magnet and a second coil wound about the portion of said second sidewall that contains each said permanent magnet.

11. A system for the magnetic suspension, propulsion, braking, and lateral control of at least one vehicle in cooperation with a passive guideway, said system comprising:

a passive reaction rail, formed of a magnetic material and extending the length of said guideway;

a stator body affixed to said vehicle in confronting relationship with said reaction rail, said stator body being formed of magnetic material and including a plurality of teeth that are spaced apart from one another;

at least one high-energy permanent magnet operable along a substantialy linear demagnetization curve and mounted to said stator body with the poles of each said permanent magnet arranged to prdouce a first magnetic field having lines of magnetic flux completing a path through each said permanent magnet, an adjoining portion of said stator body and said reaction rail, said first magnetic field producing an attractive force between said stator body and said reaction rail that tends to suspend said vehicle from said guideway;

means for maintaining a desired air gap between said guideway and said vehicle suspended from said guideway by said first magnetic field;

a polyphase, variable-voltage, variable-frequency, AC voltage source for producing a polyphase AC voltage; and a polyphase propulsion coil wound through the spaces between said teeth of said stator body, said polyphase propulsion coil for producing a wave of magnetic flux that continuously travels the length of said stator body when said polyphase, AC voltage produced by said AC voltage source is supplied to said propulsion coil, said wave of magnetic flux traveling at a speed directly proportional to the pole pitch and the frequency of said AC voltage and applying a force between said stator body and said reaction rail tending to cause said vehicle to be propelled along said guideway at said speed of said wave of magnetic flux.

12. The system of claim 11, wherein said high-energy permanent magnet operable along a substantially linear demagnetization curve comprises a rare-earth permanent magnet.

13. The system of claim 11, wherein said means for maintaining said desired air gap comprises a plurality of wheels affixed to said vehicle in confronting relationship with said guideway, said wheels maintaining said desired air gap by contacting said guideway and limiting the proximity between said stator body and said reaction rail.

14. The system of claim 11, wherein said means for maintaining said desired air gap comprises:

at least one field control coil wound about said stator body;

an air gap detection device for producing an indication of the length of said air gap between said guideway and said vehicle; and a DC power supply for supplying energy to said field control coil in response to said indication of said length of said air gap produced by said gap detection device, said energy supplied to said field control coil producing a second magnetic field that selectively increases and decreases said first magnetic field and suspends said vehicle from said guideway by said desired air gap.

15. The system of claim 14, wherein said stator body has a substantially U-shaped cross-sectional geometry defined by spaced-apart first and second sidewalls, having first and second ends, and a crossmember that extends between said first end of each of said first and second sidewalls, said spaced-apart teeth being formed in portions of each of said first and second sidewalls that are adjacent said second ends of said first and second sidewalls.

16. The system of claim 15, wherein each said high-energy permanent magnet is mounted in said crossmember of said stator body, each said permanent magnet having like magnetic poles directed toward said first sidewall of said stator body.

17. The system of claim 16, wherein said field control coil is wound longitudinally around said longitudinal crossmember of said stator body to encompass each said permanent magnet.

18. The system of claim 15, wherein each of said first and second sidewalls includes a plurality of sheets of magnetically permeable material, said sheets being laminated to one another and extending from said first ends of said first and second sidewalls to said second ends thereof.

19. The system of claim 15, including at least one pair of said high-energy permanent magnets wherein one permanent magnet of each said pair of high-energy permanent magnets is mounted in a portion of said first sidewall and the second permanent magnet is mounted in said second sidewall with each said permanent magnet being proximate said first end of said first and second sidewalls, each said permanent magnet mounted in said first sidewall having like magnetic poles directed toward said second end of said first sidewall and each said permanent magnet mounted in said second sidewall having like magnetic poles directed toward said second end of said second sidewall, said like magnetic poles directed toward said second end of said first sidewall being of opposite polarity to said like magnetic poles directed toward said second end of said second sidewall.

20. The system of claim 19, wherein said field control coil includes a first coil wound about the portion of said first sidewall of said stator body containing each said permanent magnet and a second coil wound about the portion of said second sidewall that contains each said permanent magnet.

* * * * *

UNITED STATES PATENT AND TRADEMARK OFFICE
CERTIFICATE OF CORRECTION

PATENT NO. : 4,793,263

DATED : December 27, 1988

INVENTOR(S) : John J. Basic et al.

It is certified that error appears in the above-identified patent and that said Letters Patent is hereby corrected as shown below:

| Column | Line | |
|---|---|---|
| 1 | 63 | "realtime" should be --real-time-- |
| 2 | 5 | "unit" should be --unity-- |
| 3 | 17 | "slots" should be --Slots-- |
| 4 | 6 | "suynchronous" should be --synchronous-- |
| 5 | 54 | "ony" should be --only-- |
| 5 | 59 | "cross-member" should be --crossmember-- |
| 5 | 62 | "minmize" should be --minimize-- |
| 6 | 51 | "sidewalsl" should be --sidewalls |
| 8 | 9 | insert commas (--,--) after "and" and "hence" |
| 10 | 30 | "the" should be --like-- |
| 11 | 9 | "substantialy" should be --substantially-- |
| 11 | 11 | "prdouce" should be --produce-- |

Signed and Sealed this

Fifteenth Day of October, 1991

Attest:

HARRY F. MANBECK, JR.

*Attesting Officer*    *Commissioner of Patents and Trademarks*